(12) United States Patent
Yoshizawa et al.

(10) Patent No.: US 10,684,982 B2
(45) Date of Patent: *Jun. 16, 2020

(54) CALCULATING DEVICE, CALCULATING METHOD, AND COMPUTER READABLE RECORDING MEDIUM

(71) Applicant: CASIO COMPUTER CO., LTD., Shibuya-ku, Tokyo (JP)

(72) Inventors: Hiroaki Yoshizawa, Ome (JP); Hironori Yoshikawa, Sagamihara (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/592,576

(22) Filed: Oct. 3, 2019

(65) Prior Publication Data
US 2020/0034329 A1 Jan. 30, 2020

Related U.S. Application Data

(63) Continuation of application No. 15/852,969, filed on Dec. 22, 2017, now Pat. No. 10,474,623.

(30) Foreign Application Priority Data

Dec. 26, 2016 (JP) .................................. 2016-250410

(51) Int. Cl.
*G06F 3/02* (2006.01)
*G06F 15/02* (2006.01)

(52) U.S. Cl.
CPC .............................. *G06F 15/0225* (2013.01)

(58) Field of Classification Search
None
See application file for complete search history.

(56) References Cited

U.S. PATENT DOCUMENTS 4,237,541 A * 12/1980 Mikada ............... G06F 15/0233
708/171
5,608,661 A * 3/1997 Hoolehan ............... G06F 15/02
708/136

(Continued)

FOREIGN PATENT DOCUMENTS

CN 1253644 A 5/2000
CN 1267381 A 9/2000

(Continued)

OTHER PUBLICATIONS

Chinese Office Action dated Dec. 3, 2019 (and English translation thereof) issued in Chinese Application No. 201711431592.2.

(Continued)

*Primary Examiner* — David H Malzahn
(74) *Attorney, Agent, or Firm* — Holtz, Holtz & Volek PC

(57) ABSTRACT

A print controller includes a processor and a memory. When an instruction to execute a specific calculation function is received, the processor obtains a calculation result related to the specific calculation function. When an instruction to print is received, if the instruction to execute the specific calculation function has been received a plurality of times without printing the calculation result related to the specific calculation function, which was obtained when the instruction to execute the calculation function was received one or more times before the instruction received at a last time of the plurality of times, the processor causes a printing device to print the calculation result related to the specific calculation function, which was obtained when the instruction to execute the specific calculation function was received at the last time of the plurality of times.

10 Claims, 10 Drawing Sheets

(56) References Cited

U.S. PATENT DOCUMENTS

| | | | |
|---|---|---|---|
| 5,682,481 | A | 10/1997 | Fuyama |
| 9,720,877 | B2 | 8/2017 | Muraki |
| 2005/0051618 | A1 | 3/2005 | Suzuki |
| 2009/0248532 | A1 | 10/2009 | Sugiura |
| 2015/0112876 | A1* | 4/2015 | Hakamada ............. G06Q 10/30 |
| | | | 705/308 |
| 2015/0269114 | A1 | 9/2015 | Muraki |
| 2018/0081851 | A1 | 3/2018 | Arikawa et al. |
| 2018/0181535 | A1 | 6/2018 | Yoshizawa et al. |
| 2020/0034329 | A1* | 1/2020 | Yoshizawa .......... G06F 15/0225 |

FOREIGN PATENT DOCUMENTS

| | | | |
|---|---|---|---|
| CN | 200969093 | Y | 10/2007 |
| CN | 101266707 | A | 9/2008 |
| CN | 101551930 | A | 10/2009 |
| CN | 202771532 | U | 3/2013 |
| CN | 104933006 | A | 9/2015 |
| EP | 1970869 | A2 | 9/2008 |
| JP | 09035143 | A | 2/1997 |
| JP | H11259768 | A | 9/1999 |
| WO | 98043149 | A2 | 10/1998 |
| WO | 99011006 | A2 | 3/1999 |

OTHER PUBLICATIONS

Casio Electronics Co., LTD, "fx-82MS, fx-83MS, fx-85MS, fx-270MS, fx-300MS, fx-350MS User's Guide", Dokoba, May 8, 2010, pp. 1-2, retrieved online: <https://www.doc88.com/p-34980716283.html>.

* cited by examiner

FIG. 3A1 — 22c — 302

| NUMBER | DATA | |
|---|---|---|
| 001 | 85 | [+] |
| 002 | 120 | [+] |
| 003 | 7 | [−] |
| 004 | [*] | 198 |
| 005 | 500 | [CHANGE] |
| 006 | | |

FIG. 3A2 — 310

| NUMBER | DATA | |
|---|---|---|
| 001 | 85 | [+] |
| 002 | 120 | [+] |
| 003 | 7 | [−] |
| 004 | [*] | 198 |
| 005 | 508 | [CHANGE] |
| 006 | | |

FIG. 3A3 — 400

| NUMBER | DATA | |
|---|---|---|
| 001 | 85 | [+] |
| 002 | 120 | [+] |
| 003 | 7 | [−] |
| 004 | [*] | 198 |
| 005 | 598 | [CHANGE] |
| 006 | | |

FIG. 3B1 — 22c — 302

| NUMBER | DATA | |
|---|---|---|
| 001 | 48 | [+] |
| 002 | 50 | [×] |
| 003 | 3 | [=] |
| 004 | | 150 |
| 005 | [*] | 198 |
| 006 | 500 | [CHANGE] |
| 007 | | |

FIG. 3B2 — 310

| NUMBER | DATA | |
|---|---|---|
| 001 | 48 | [+] |
| 002 | 50 | [×] |
| 003 | 3 | [=] |
| 004 | | 150 |
| 005 | [*] | 198 |
| 006 | 508 | [CHANGE] |
| 007 | | |

FIG. 3B3 — 400

| NUMBER | DATA | |
|---|---|---|
| 001 | 48 | [+] |
| 002 | 50 | [×] |
| 003 | 3 | [=] |
| 004 | | 150 |
| 005 | [*] | 198 |
| 006 | 598 | [CHANGE] |
| 007 | | |

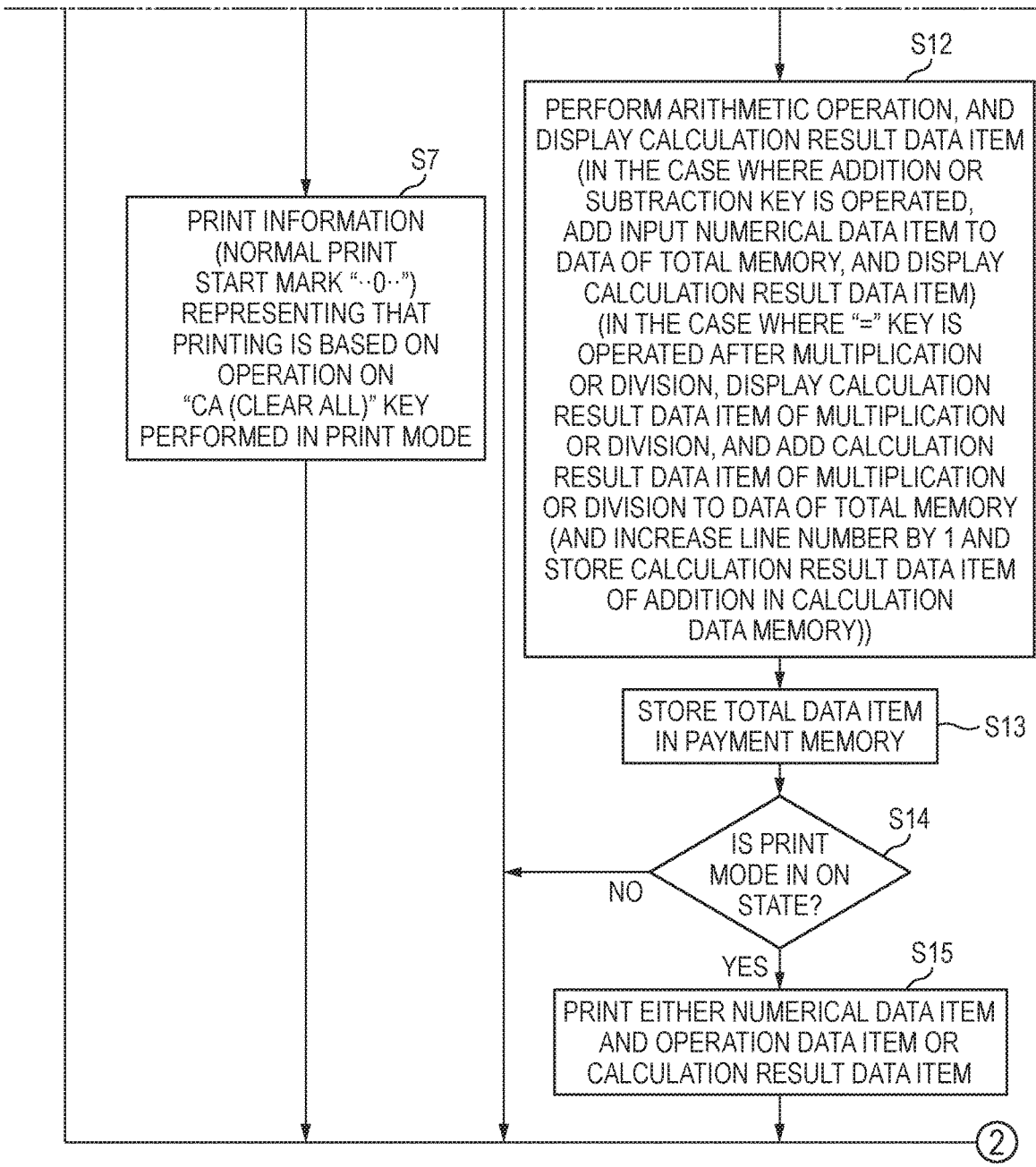

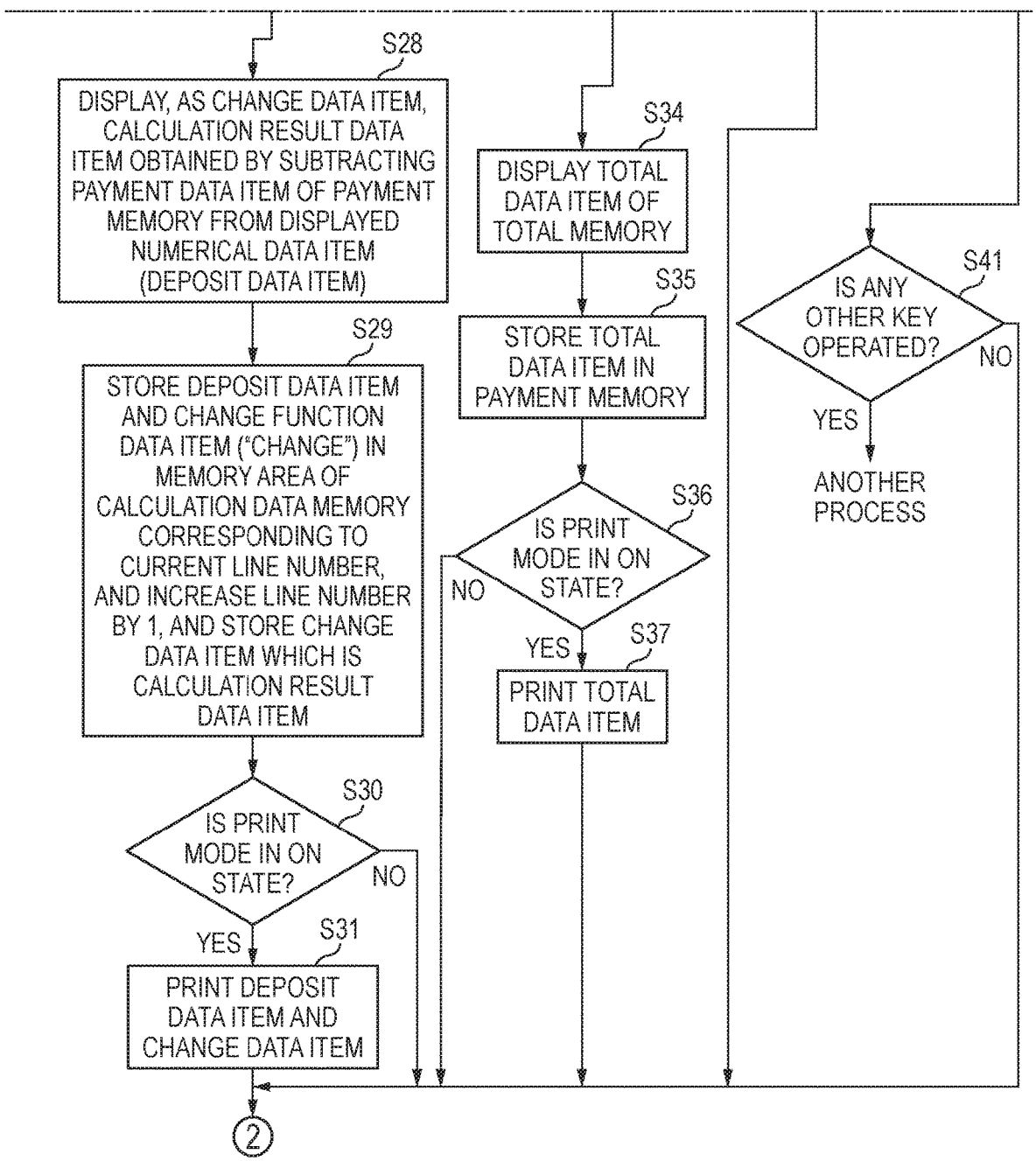

CALCULATING DEVICE, CALCULATING METHOD, AND COMPUTER READABLE RECORDING MEDIUM

CROSS-REFERENCE TO RELATED APPLICATION

This is a Continuation Application of U.S. application Ser. No. 15/852,969 filed on Dec. 22, 2017, now U.S. Pat. No. 10,474,623, which is based upon and claims the benefit of priority under 35 USC 119 of Japanese Patent Application No. 2016-250410 filed on Dec. 26, 2016, the entire contents both of which, including the description, claims, drawings, and abstract, are incorporated herein by reference.

BACKGROUND OF THE INVENTION

1. Field of the Invention

The present invention relates to a calculating device, a calculating method, and a computer readable recording medium having a change calculating function.

2. Description of the Related Art

In the related art, electronic cash registers for calculating the payments of purchases and so on, urging users to input deposits, calculating change, and displaying a variety of information such as the amounts of money have been considered (see Patent Document 1 for instance).

Also, with regard to calculators, products for displaying a calculation result if a user inputs a calculation expression, and calculating change if the user inputs a deposit when the calculation result is displayed and operates a "CHANGE" (change) key, and displaying the change have been developed.

[Patent Document 1] Japanese Patent Application Laid-Open No. 09-035143

SUMMARY OF THE INVENTION

Such a electronic cash register or such a calculator of the related art has a change calculating function, and can calculate change with respect to a calculated payment (total) if a deposit is input; however, since it does not allow a user to re-input a different deposit with respect to the same payment after the change is calculated, the user cannot make it recalculate change by a simple operation.

The present invention was made in view of the above-described problem, and an object of the present invention is to provide a calculating device capable of calculating change respect to a payment if a user inputs a deposit and recalculating change with respect to the same payment if the user re-inputs a different deposit by a simple operation, a calculating method, and a computer-readable recording medium.

According to one aspect of to the present inventions, a calculating device includes a key input unit having a plurality of numeric keys and a plurality of operation keys, a display; and a processor. The processor performs the followings: calculating a payment data item from input calculation data including numerical data items input from at least one of the plurality of numeric keys according to user's operations and operation data items input from at least one of the plurality of operation keys according to user's operations; in the case where input of a first deposit data item from at least one of the plurality of numeric keys and input of an instruction of a change function from the key input unit according to user's operations are received, controlling the display such that the display displays a calculation result data item obtained by subtracting the payment data item from the first deposit data item, as a first change data item; and in the state where the display displays the first change data item, even though the input calculation data are not re-input, if input of a second deposit data item from at least one of the plurality of numeric keys and input of an instruction of the change function from the key input unit according to user's operations are received, controlling the display such that the display displays a calculation result data item obtained by subtracting the payment data item from the second deposit data item, as a second change data item.

According to the present invention, with respect to a payment, after a deposit is input and change is calculated, it is possible to re-input a different deposit by a simple operation and make the calculating device recalculate change.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIGS. 3A1 to 3B3 are views illustrating specific examples of calculation data stored in a calculation data memory 22c of the calculator 10 with the printer.

DETAILED DESCRIPTION

Hereinafter, embodiments of the present invention will be described with reference to the accompanying drawings.

Figure 1:
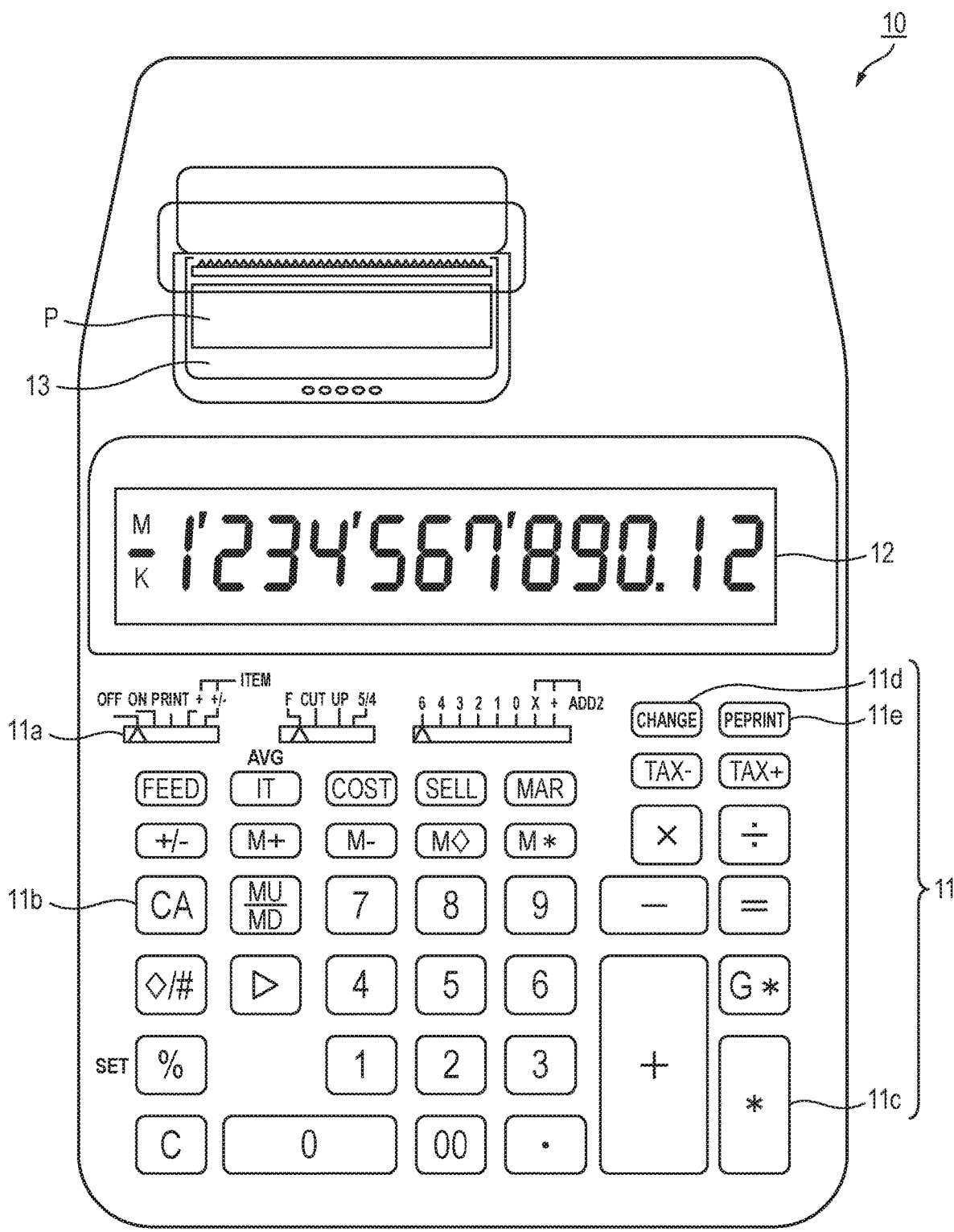
FIG. 1 is a front view illustrating the configuration of the external appearance of a calculator 10 with a printer according to an embodiment of a calculating device of the present invention.

FIG. 1 is a front view illustrating the configuration of the external appearance of a calculator 10 with a printer according to an embodiment of a calculating device of the present invention.

The calculator 10 with the printer is configured as a dedicated calculator 10 for calculation; however, it can also be configured as any other device having a calculating function and a printing function (a device having a calculation data print process program installed therein), for example, a personal computer, a tablet computer, a smart phone, a portable phone, a touch panel type PDA (personal digital assistant), an electronic book, or a portable game console.

On the other hand, a calculating device having no physical keys (buttons) unlike the calculator 10 displays a software keyboard similar to the keys of the calculator 10, and performs calculation processes in response to key operations on the software keyboard. Also, a calculating device having no printing device unlike the calculator 10 with the printer establishes a communication connection with an external printing device by near field communication or the like, and transmits a print control signal and print data to the printing device, such that the print design performs a printing process.

The calculator 10 with the printer according to the present embodiment has not only normal calculating functions such as addition, subtraction, multiplication, and division, a display function, and a printing function, but also various other functions such as a totaling function (a result output function) "*" of determining the result of calculation of total (calculation result) data based on numerical data and operation data "+", "−", "×", "÷", and "=" input according to user's operations (a function of issuing an instruction to display and print the total data), a change function "CHANGE" of calculating change data from deposit data with respect to payment data which is the total (calculation result) data, a calculation data storing function of storing a data sequence obtained by combinations of the calculating function, the totaling function "*", and the change function "CHANGE", and a stored-data printing function of printing calculation data stored by the calculation data storing function.

More specifically, if numerical data input according to user's operations, and addition function data "+", "−", and "=" input according to user's operations to add the numerical data to data of a total memory 22e (to be described below), or other arithmetic operation function data "×" and "÷" are stored as calculation data in a calculation data memory 22c (to be described below), and a user's operation on a "*" (totaling function (result output function)) key operation is received, totaling function (result output function) data "*" is stored in the calculation data memory 22c in association with the calculation data stored in the calculation data memory 22c. Also, if numerical data representing a deposit and input according to user's operations, and a user's operation on a "CHANGE" (change function) key (an instruction) are received, deposit data, "CHANGE" (change function) data, and change data are stored in the calculation data memory 22c in association with calculation data stored in the calculation data memory 22c. Further, by the stored-data printing function, the calculation data stored in the calculation data memory 22c is printed, and the total (calculation result) data obtained by totaling the calculation data associated with the totaling function (the result output function) "*" is printed, and the deposit data of the calculation data associated with the change function "CHANGE" and change data obtained by subtracting payment data which is the total data from the deposit data are printed.

Also, the calculator 10 with the printer according to the present embodiment has an automatic total addition function of automatically adding the totaling function (the result output function) data item "*" to a calculation data sequence composed of numerical data according to user's operations and addition function data "+", "−", and "=" or other arithmetic operation function data "×" and "÷", and calculating total (calculation result) data of the calculation data sequence, and calculating change data by subtracting payment data which is the total data from deposit data, if a user inputs the numerical data as the deposit data and operates a "CHANGE" key assigned to the change function, even though the user does not operates the "*" (totaling function (result output function)) key (the user forgets to operate the "*" key), after inputting the calculation data sequence.

The calculator 10 with the printer includes a key input unit 11 provided on the front side of a main body case such that it is easy to operate the key input unit when the main body case is mounted on a desk, and also includes a display unit 12 and a printing unit 13 provided on the rear side from the key input unit 11.

The key input unit 11 has numeric keys, operation keys, totaling function (result output function) keys, a change function key, print function keys, and other function keys.

The numeric keys include a plurality of keys corresponding to, for example, 00 and 0 to 9, respectively. The operation keys include a plurality of keys corresponding to, for example, an addition ("+") key, a subtraction ("−") key, a multiplication ("×") key, a division ("÷") key, and an equal ("=") key, respectively.

Also, whenever the user inputs numerical data and operates the addition ("+") key, the calculator 10 with the printer (an adder type calculator) adds the numerical data to numerical data stored in the total memory 22e (to be described below), and displays the addition result, and prints the numerical data and the operation data "+". Further, when the numerical data of the total memory 22e is displayed, if the user pushes the "*" key assigned to the totaling function (the result output function), the calculator prints the displayed numerical data as total (calculation result) data. Also, if the user inputs numerical data and operates the subtraction ("−") key, the calculator subtracts the numerical data from numerical data stored in the total memory 22e, and displays the subtraction result, and prints the numerical data and the operation data "−". If the user inputs numerical data representing a target operand number, and pushes the multiplication ("×") key or the division ("÷") key, the calculator prints the operand number which is the numerical data, and the operation data "+". Thereafter, if the user inputs numerical data representing an operand number, and pushes the "=" key, the calculator prints the numerical data and the operation data "=", and prints the result of the multiplication or division result, and adds the multiplication or division result to numerical data of the total memory 22e (in this case, the addition result is not displayed). As described above, even in response to an operation on the subtraction ("−") key or the equal ("=") key, the calculator performs addition or subtraction with respect to numerical data of the total memory 22e. Therefore, similar to data related to the addition ("+") key, data related to the subtraction ("−") key and the equal ("=") key can also be included in addition function data.

The totaling function (result output function) keys include an "*" (totaling function) key 11c for determining total calculation (a key for issuing an instruction to display and print a total).

The change function key includes a "CHANGE" (change function) key 11d for calculating change data by subtracting payment data which is total data from numerical data input as deposit data.

The print function keys include a power (print mode) switch 11a and a "REPRINT" (stored-data print) key 11e. The power (print mode) switch 11a has switch positions for switching to a power-off state, a power-on (print mode OFF) state, or a power-on (print mode ON) state.

The other function keys include, for example, a "Clear All" key (a "CA" key 11b), a "Clear" key (a "C" key), and so on.

The display unit 12 is composed of a segment type fluorescent tube display unit or a dot matrix type liquid crystal display unit. If the user inputs numerical data by operating keys of the key input unit 11, the input numerical data and numerical data which is a calculation result are displayed on the display unit 12. Also, in a state display area provided along a side of the display unit 12, numbers, letters, symbols representing various states, such as a set operation mode and the contents of displayed numerical data (such as "TOTAL" and "CHANGE"), are displayed.

The printing unit 13 has, for example, a thermal transfer type printing mechanism, and outputs input calculation data composed of numerical data and operation data, and calculation result data such as total (payment) data and change data obtained by calculating the calculation data, by printing them on a recording sheet P on the basis of the OFF/ON state of the print mode set by an operation on the power (print mode) switch 11a, and a state where the "REPRINT" key 11e has been operated.

Figure 2:
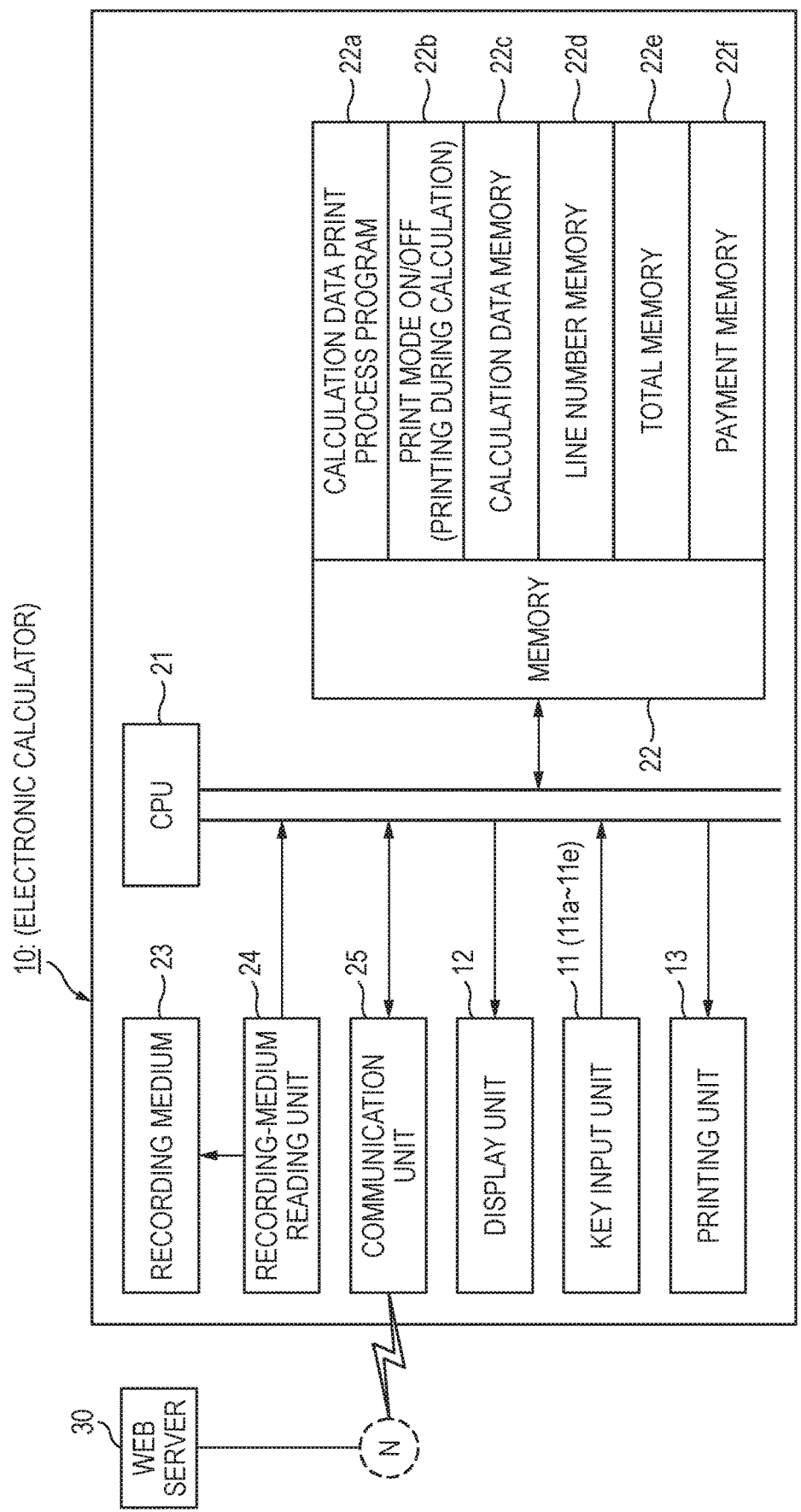
FIG. 2 is a block diagram illustrating the electronic circuit configuration of the calculator 10 with the printer.

FIG. 2 is a block diagram illustrating the electronic circuit configuration of the calculator 10 with the printer.

The electronic circuit of the calculator 10 with the printer includes a CPU (a processor) 21 which is a computer. The CPU 21 performs various calculating functions and a calculation data printing function according to user's operations on the key input unit 11 by controlling operations of individual circuit units according to calculator control programs stored in a memory 22.

The CPU (a processor) 21 is connected to the key input unit 11, the display unit 12, the printing unit 13, and the memory 22, and is also connected to a recording-medium reading unit 24 configured to read data recorded on an external recording medium 23 such as a memory card, and a communication unit 25 configured to perform communication with an external device (for example, a Web server 30 to be described below).

The calculator control programs are stored in the memory 22 in advance; however, they may be read out from the external recording medium 23 by the recording-medium reading unit 24 and be stored in the memory 22, or may be downloaded from the Web server (a program server) 30 on a communication network N into the memory 22 via the communication unit 25.

The calculator control programs include not only various calculation process programs according to user's operations but also a calculation data print process program 22a for printing calculation data of calculation processes performed according to the calculation process programs.

Also, in the memory 22, a PRINT mode memory 22b, the calculation data memory 22c, a line number memory 22d, the total memory 22e, and a payment memory 22f are secured.

When the power (print mode) switch 11a is at the "ON" position, setting data representing that the print mode is in the OFF state is stored in the PRINT mode memory 22b, and when the power (print mode) switch 11a is at the "PRINT" position, setting data representing that the print mode is in the ON state is stored in the PRINT mode memory. Also, when the print mode is in the ON state, whenever calculation data is input, or a total, a payment, or change is determined (an instruction to display and print is issued), printing is performed.

If a series of calculation data items is input according to user's operations, they are stored in memory areas of the calculation data memory 22c associated with line numbers sequentially increasing.

FIG. 3 is a view illustrating specific examples of calculation data stored in the calculation data memory 22c of the calculator 10 with the printer. In FIG. 3, (A1) to (A3) are views illustrating a specific example (a first embodiment) of a case of repeatedly recalculating change data items from different deposit data items in response to the "CHANGE" key 11d with respect to a total (payment) data item of input calculation data items, and in FIG. 3, (B1) to (B3) are views illustrating a specific example (a second embodiment) of a case of repeatedly recalculating change data items from different deposit data items in response to the "CHANGE" key 11d with respect to input calculation data items including multiplication or division.

In each mode of a calculation data storing mode for receiving a series of calculation data including numerical data and operation data and storing the calculation data and a reprint mode (a stored-data print mode) according to an operation on the "REPRINT" key 11e, data of the line numbers of process object memory areas of the calculation data memory 22c is stored in the line number memory 22d.

When calculation data composed of a combination of numerical data and operation data "+", "−", "×", "÷", and "=" is input, whenever an operation data item "+" or "−" or "=" is input, a total (calculation result) data item representing the total of some numerical data items input immediately before that moment is stored in the total memory 22e.

Here, each of the operation data item +", "−", and "=" has its unique operation function, and also functions as a data item to issue an instruction to add a calculation data item to data stored in the total memory 22e, and thus is defined as an addition function data item as described above.

Also, total (calculation result) data stored in the total memory 22e is cleared if an initial setting process is performed in a power-on state, or if the "CA" ("Clear All") key 11b is operated, or if a numerical data item is input for the first time after the "*" (totaling function (result output function)) key 11c is operated.

Whenever a totaling function (result output function) "*" according to an operation on the "*" (totaling function (result output function)) key 11c is input, a payment data item is obtained by adding a numerical data item input immediately before the operation on the "*" key to a total (calculation result) data item stored in the total memory 22e and is stored in the payment memory 22f.

Also, payment data stored in the payment memory 22f is cleared if the initial setting process is performed in the power-on state, or if the "CA" ("Clear All") key 11b is operated.

In the calculator 10 with the printer configured as described above, the CPU 21 controls operations of the individual circuit units the according to commands described in the calculator control programs (including the calculation data print process program 22a) such that software and hardware operate together to implement various calculating functions and the calculation data printing function as will be described in the following operation description.

Now, operations of the calculator 10 with the printer having the above-described configuration will be described.

Figure 4:
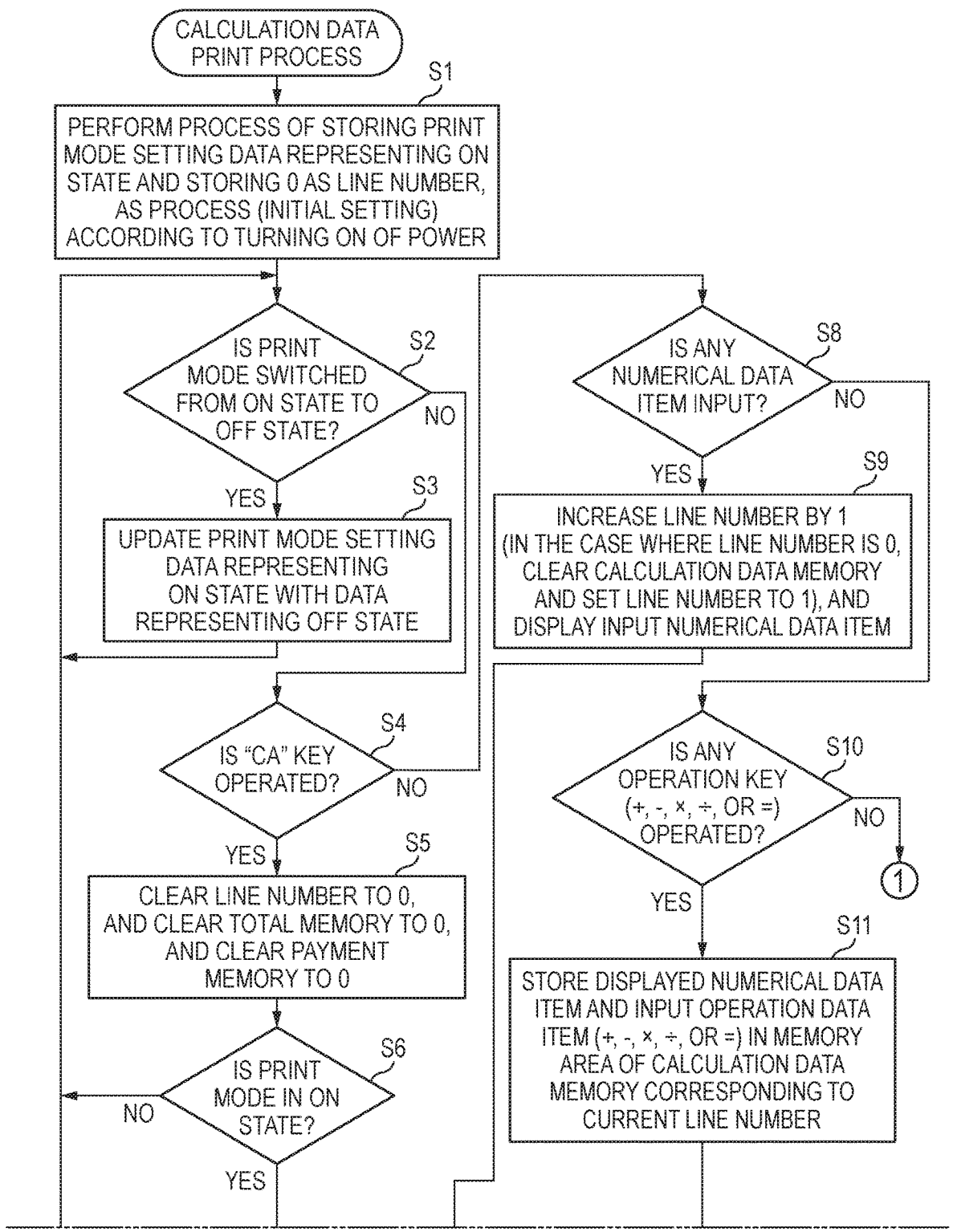
FIG. 4 is a flow chart illustrating a first part of a calculation data print process of the calculator 10 with the printer.
Figure 5:
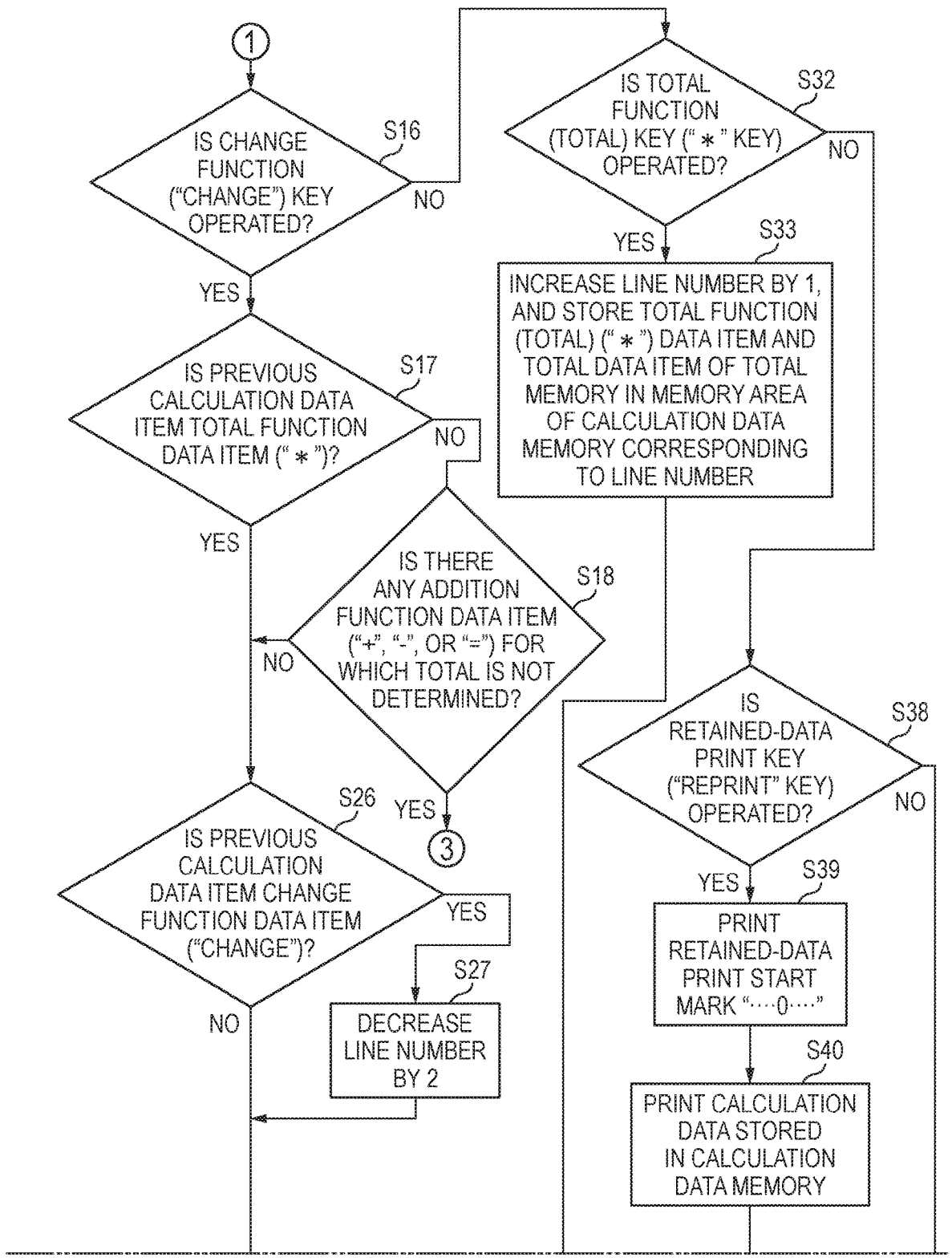
FIG. 5 is a flow chart illustrating a second part of the calculation data print process of the calculator 10 with the printer.
Figure 6:
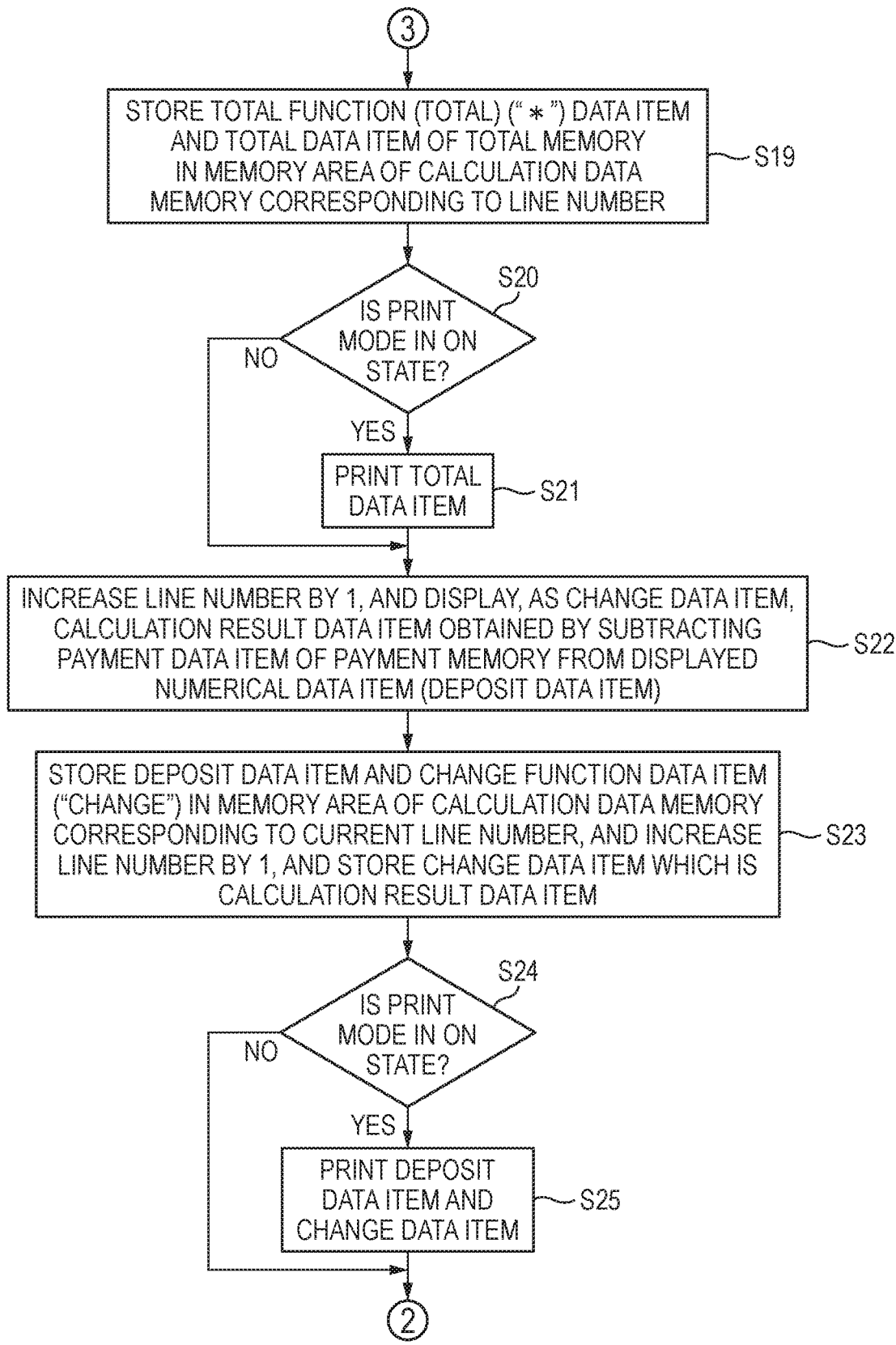
FIG. 6 is a flow chart illustrating a third part (an automatic total addition process) of the calculation data print process of the calculator 10 with the printer.

FIG. 4, FIG. 5, and FIG. 6 are flow charts illustrating a first part, a second part, and a third part (an automatic total addition process) of a calculation data print process of the calculator 10 with the printer.

First Embodiment

Figure 7:
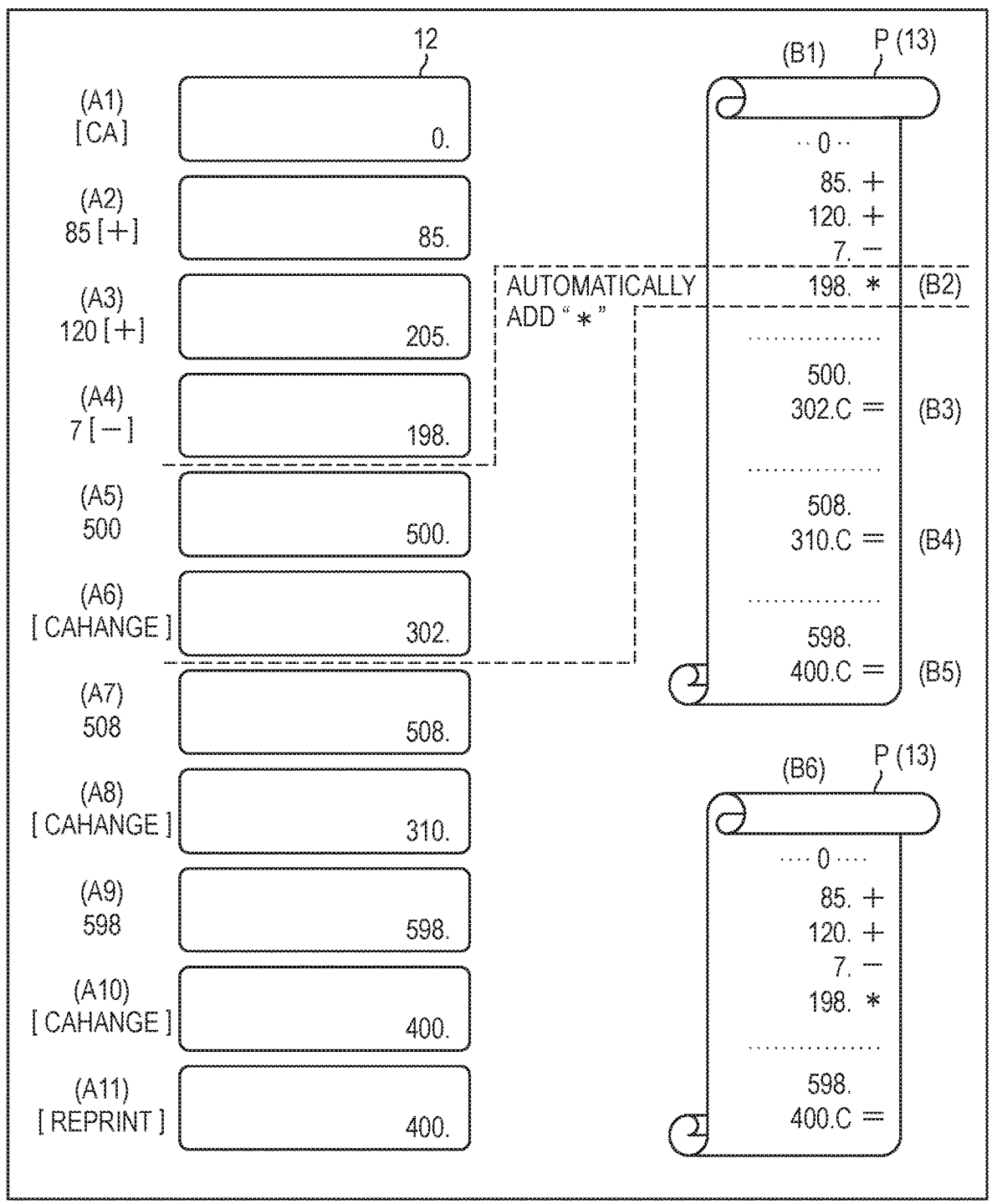
FIG. 7 is a view illustrating display and print operations according to user's operations in a first embodiment of the calculation data print process.

FIG. 7 is a view illustrating display or print operations according to user's operations in the first embodiment of the calculation data print process.

In the calculator 10 with the printer, if the power is turned on (here, the power (print mode) switch 11a is switched to the "PRINT" (print mode ON) position) by a user's operation, the CPU 21 performs a process of storing setting data representing that the print mode is in the ON state, in the PRINT mode memory 22b, and setting the operation mode to the calculation data storing mode, and storing data representing a line number "0" in the line number memory 22d, as an initial setting process according to turning on of the power (STEP S1).

When the print mode is in the ON state, if the power (print mode) switch 11a is switched to the "ON" (print mode OFF) position ("Yes" in STEP S2), the setting data representing that the print mode is the ON state is switched to the setting data representing that the print mode is in the OFF state (STEP S3).

As described above, in the calculator 10 with the printer, it is possible to use the power (print mode) switch 11a to set whether to operate the calculator in the print mode or not.

Subsequently, if the "CA" key 11b is operated as shown in (A1) of FIG. 7 ("Yes" in STEP S4), the line number data is cleared to "0" again, and the total (calculation result) data of the total memory 22e and the payment data of the payment memory 22f are also cleared to "0" (STEP S5).

Here, if the CPU 21 determines that the printing method is in the ON state ("Yes" in STEP S6), as shown in (B1) of FIG. 7, a normal print start mark "••0••" representing that printing is based on an operation on the "CA" ("Clear All") key 11b performed in the print mode is printed on a recording sheet P by the printing unit 13 (STEP S7).

Then, as shown in (A2) of FIG. 7, if a numerical data item "85" which is, for example, an article price is input according to user's operations on numeric keys ("Yes" in STEP S8), the line number data is increased by 1, thereby being updated with "01", and the input numerical data item "85" is displayed on the display unit 12 (STEP S9). At this time, in a case where the line number data is "0", the content of the calculation data memory 22c is cleared, and then the line number is updated with "01".

Here, if the addition ("+") key is operated ("Yes" in STEP S10), in a memory area of the calculation data memory 22c (see (A1) of FIG. 3) corresponding to the current line number "01" stored in the line number memory 22d, a calculation data item composed of the displayed numerical data item "85" and an operation data item "+" input by the addition ("+") key is stored (STEP S11).

Then, calculation according to the calculation data item "85+" is performed, and the calculation result data item (here, "85") is displayed on the display unit 12. Also, according to the input operation data item "+" (addition), the input numerical data item "85" is added to the total (calculation result) data (the current data "0") of the total memory 22e, and a total (calculation result) data item "85" is stored (STEP S12). Further, the total (calculation result) data item "85" is stored as a payment data item in the payment memory 22f.

Then, if it is determined that the print mode is in the ON state ("Yes" in STEP S14), as shown in (B1) of FIG. 7, the numerical data item "85" retained in the calculation data memory 22c in association with the current line number "01", and the operation data item "+" are printed on the recording sheet P (STEP S15).

Thereafter, as shown in (A3) of FIG. 7, if a numerical data item "120" which is the next article price is input, and the "+" key is operated, in the same way as described above, the line number data is increased by 1, thereby being updated with "02", and the input numerical data item "120" and an operation data item "+" corresponding to the "+" key are retained in a memory area of the calculation data memory 22c corresponding to the line number "02" (STEPS S8 to S11).

Then, calculation according to the calculation data "85+120+" of the calculation data memory 22c is performed, and the calculation result data item (here, "205") is displayed on the display unit 12. Also, according to the input operation data item "+" (addition), the input numerical data item "120" is added to the total (calculation result) data (the current data "85") of the total memory 22e, and a total (calculation result) data item "205" is stored (STEP S12). Also, the total (calculation result) data item "205" is stored as a payment data item in the payment memory 22f (STEP S13).

Then, in the same way as described above, if it is determined that the print mode is in the ON state ("Yes" in STEP S14), as shown in (B1) of FIG. 7, the numerical data item "120" retained in the calculation data memory 22c in association with the current line number "02", and the operation data item "+" are printed on the recording sheet P (STEP S15).

Further, as shown in (A4) of FIG. 7, for example, if the user inputs a numerical data item "7" which is a discount applied since a shopping bag is unnecessary, and operates the "−" key, in the same ways as described above, the line number is increased by 1, thereby being updated with "03", and the input numerical data item "7" and the operation data item "−" are stored in a memory area of the calculation data memory 22c corresponding to the line number "03" (STEPS S8 to S11).

Then, calculation according to the calculation data "85+120+7−" of the calculation data memory 22c is performed, and the calculation result data item (here, "198") is displayed on the display unit 12. Also, according to the input operation data item "−" (subtraction), the minus value of the input numerical data item "7" is added to the total (calculation result) data item (at this moment, "205") of the total memory 22e, and a total (calculation result) data item "198" is stored (STEP S12). Also, the total (calculation result) data item "198" is stored as a payment data item in the payment memory 22f (STEP S13).

Then, in the same way as described above, it is determined that the print mode is in the ON state ("Yes" in STEP S14), and the numerical data item "7" and the operation data item "−" stored in the calculation data memory 22c in association with the current line number "03" are printed on the recording sheet P (STEP S15).

The calculation data sequence "85+205+7−" input according to the user's operations until that moment is received, and the calculation result (total) data item "198" according to the input sequence is displayed on the display unit 12. Therefore, even though the user (a salesclerk) forgets to operate the "*" (totaling function (result output function)) key 11c for determining the total (the key for issuing an instruction to display and print the total) (total determination), if the user inputs a numerical data item "500" representing a deposit received from a customer (STEPS S8 and S9 (the line number is updated with "04") and operates the "CHANGE" (change function) key 11d ("Yes" in STEP S16) as shown in (A5) and (A6) in order to calculate change with respect to the deposit, whether the calculation data item stored (saved) in a memory area of the calculation data memory 22c (see (A1) of FIG. 3) corresponding to the previous line number "03" of the current line number "04" is a totaling function data item "*" is determined (STEP S17).

If it is determined that the calculation data item associated with the previous line number "03" is "7−" and is not the totaling function data item "*" (the totaling function data item "*" has not been stored in association with the calculation data sequence) ("No" in STEP S17), whether the calculation data sequence includes any addition function data item ("+", "−", or "=") for which the total has not been determined (an instruction to display and print the total has not been issued) (total determination has not been performed) is determined (STEP S18).

If it is determined that any one of the operation data items "+" and "−" included in the calculation data sequence "85+120+7−" stored (saved) in the calculation data memory 22c (see (A1) of FIG. 3) is an addition function data item for which the total has not been determined (an instruction to display and print the total has not been issued) ("Yes" in STEP S18), the process proceeds to the automatic total addition process of FIG. 6.

Then, the totaling function (result output function) data item "*" and the total (calculation result) data item "198" stored in the total memory 22e are stored in a memory area of the calculation data memory 22c corresponding to the current line number "04" (STEP S19).

Then, in the case where the print mode is in the ON state ("Yes" in STEP S20), as shown in (B2) of FIG. 7, the total (calculation result) data item "198" and the totaling function (result output function) data item "*" stored in the total memory 22e are printed on the recording sheet P (STEP S21). Meanwhile, in the case where the print mode is not in the ON state, in other words, the print mode is in the OFF state, the process proceeds to STEP S22, without performing printing.

Then, the current line number "04" is increased by 1, thereby being updated with "05", and a calculation data item "302" obtained by subtracting the payment data item "198" stored in the payment memory 22f from the numerical data item "500" displayed as a deposit data item as shown in (A5) of FIG. 7 is displayed as a change data item as shown in (A6) of FIG. 7 (STEP S22).

Subsequently, the deposit data item "500" and a change function data item "CHANGE" are stored in a memory area of the calculation data memory 22c corresponding to the current line number "05", and the line number is increased by 1, thereby being updated with "06", and the calculation data item "302" is stored as a change data item (STEP S23).

Then, in the case where the print mode is in the ON state ("Yes" in STEP S24), as shown in (B3) of FIG. 7, the deposit data item "500" and the change data item "302" stored in the calculation data memory 22c are printed on the recording sheet P (STEP S25).

At this stage, for example, if the user (a salesclerk) inputs a numerical data item "508" representing a deposit received from the customer again (STEPS S8 and S9 (the line number is updated with "07"), and operates the "CHANGE" (change function) key 11d (performs an operation of inputting the "CHANGE" (change function) key 11d again) as shown in (A7) and (A8) of FIG. 7 ("Yes" in STEP S16) since the customer wants to round the change data item "302", it is determined that a calculation data item immediately before the current line number "07" is not the totaling function data item "*" ("No" in STEP S17). However, since there is the totaling function data item "*" stored after the calculation data sequence "85+120+7−", it is determined that all of the operation data items "+" and "−" are addition function data items for which the total has been determined (an instruction to display and print the total has been issued) ("No" in STEP S18).

Then, it is determined that the calculating function data item immediately before the current line number "07" is a change function data item "CHANGE" corresponding to the line number "05" (in other words, the current operation of inputting the "CHANGE" (change function) key 11d is a re-inputting operation) ("Yes" in STEP S26).

Then, the current line number "07" is decreased by 2, thereby being updated with "05" (STEP S27), and a calculation result data item "310" obtained by subtracting the payment data item "198" stored in the payment memory 22f from the numerical data item "508" which is the current deposit data item displayed as shown in (A7) of FIG. 7 is displayed as an update change data item (STEP S28).

Subsequently, as shown in (A2) of FIG. 3, the deposit data item "508" and the change function data item "CHANGE" are stored in the memory area of the calculation data memory 22c corresponding to the current line number "05" by rewriting, and the line number is increased by 1, thereby being updated with "06", and the change data item "310" which is the calculation result data item is stored by rewriting (STEP S29).

Then, in the case where the print mode is in the ON state ("Yes" in STEP S30), as shown in (B4) of FIG. 7, the deposit data item "508" and the change data item "310" stored as update data items, and are printed on the recording sheet P (STEP S31).

Thereafter, if the user (a salesclerk) inputs a numerical data item "598" representing a deposit received from the customer again (STEPS S8 and S9 (the line number is updated with "07"), and operates the "CHANGE" (change function) key 11d (performs another operation of re-inputting the "CHANGE" (change function) key) ("Yes" in STEP S16) since the customer wants to round the change data item "310", in the same way as described above, it is determined that the previous calculation data item is not the totaling function data item "*" but the total of the calculation data sequence has been determined ("No" in STEP S17 and "No" in STEP S18), and the previous calculating function data item is the change function data item "CHANGE" (in other words, it is determined that the current operation of inputting the "CHANGE" (change function) key 11d is a re-inputting operation) ("Yes" in STEP S26).

Then, in the same way as described above, the current line number "07" is decreased by 2, thereby being updated with "05" (STEP S27), and a calculation result data item "400" obtained by subtracting the payment data item "198" stored in the payment memory 22f from the numerical data item "598" displayed as the current deposit data item as shown in (A9) of FIG. 7 is displayed as an update change data item as shown in (A10) of FIG. 7 (STEP S28).

Subsequently, as shown in (A3) of FIG. 3, the deposit data item "598" and the change function data item "CHANGE" are stored in the memory area of the calculation data memory 22c corresponding to the current line number "05" by rewriting, and the line number is increased by 1, thereby being updated with "06", and the change data item "400" which is the calculation result data item is stored by rewriting (STEP S29).

Then, in the case where the print mode is in the ON state ("Yes" in STEP S30), as shown in (B5) of FIG. 7, the deposit data item "598" and the change data item "400" stored as update data items in the calculation data memory 22c are printed on the recording sheet P (STEP S31).

Thereafter, if the user operates the "REPRINT" (stored-data print) key 11e as shown in (A11) of FIG. 7 in order to obtain a printed copy including the payment data item "198" which is the calculation result (the total), the final deposit data item "598", and the final change data item "400" ("Yes" in STEP S38), as shown in (B6) of FIG. 7, a stored-data print start mark "••••0••••" representing that printing of the calculation data sequence is based on an operation on the "REPRINT" key 11e is printed on the recording sheet P (STEP S39).

Then, the calculation data sequence stored (saved) in the calculation data memory 22c (see (A3) of FIG. 3) is read out, and as shown in (B6) of FIG. 7, data items "85+", "120+", "7-", "198*", "598", and "400 C=" are reprinted on the recording sheet P (STEP S40).

Therefore, after the user inputs a deposit data item with respect to a payment data item which corresponds to a calculation data sequence and for which the total has been determined, and makes the calculator display a change data item, the user can input a different deposit data item again in order to recalculate a change data item. Even in this case, by simple operations, it is possible to repeatedly re-input deposit data items and make the calculator recalculate and display change data items.

Also, even through the user forgets to perform determination of the total of the input calculation data sequence (the user forgets to issue an instruction to display and print the total), if the user inputs a deposit data item and operates the "CHANGE" key 11d, the calculator automatically adds the totaling function data item "*", and determines the total (calculation result) data item stored in the total memory 22e, and calculates and displays a change data item obtained by subtracting the payment data item which is the total data item from the deposit data item.

Second Embodiment

Figure 8:
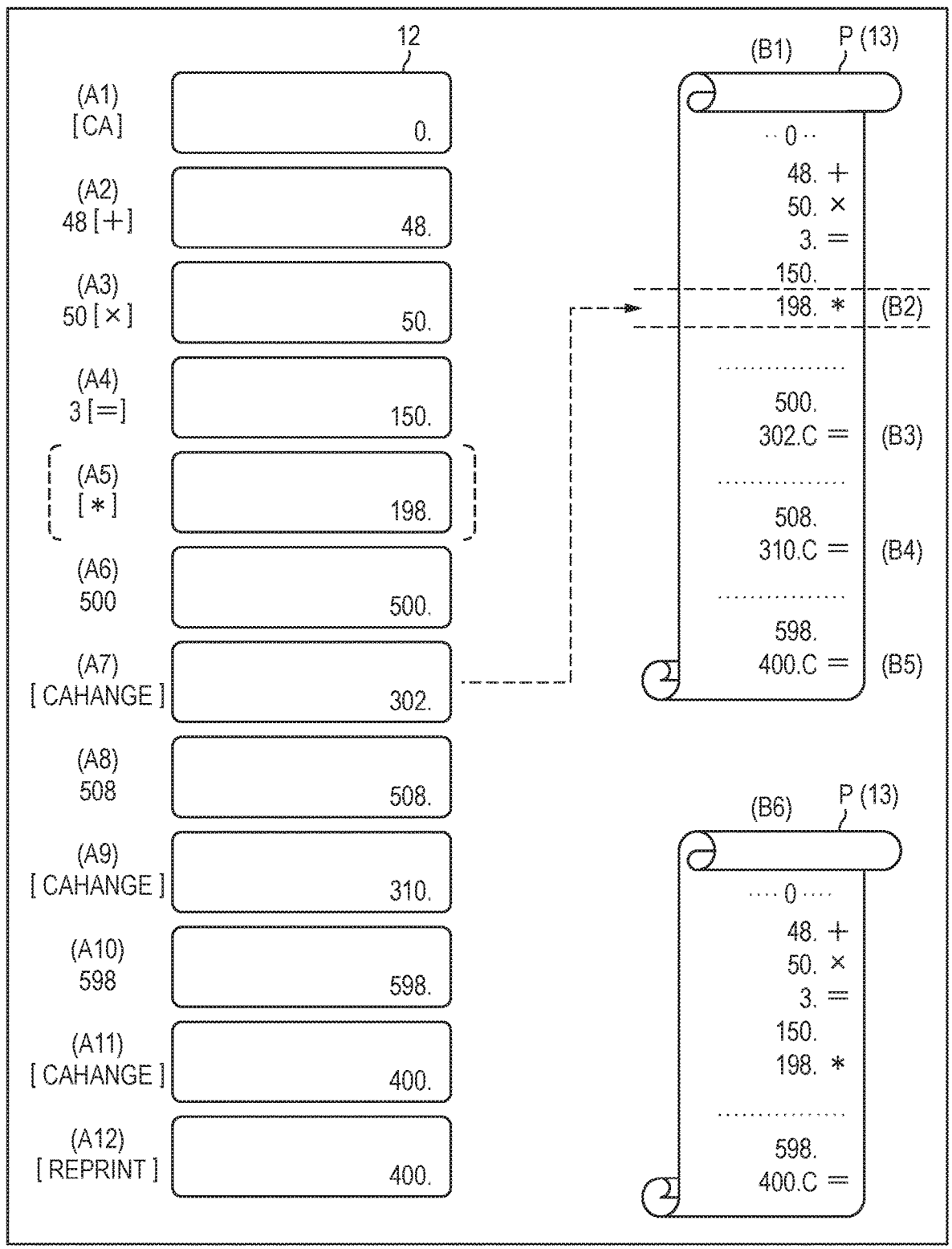
FIG. 8 is a view illustrating display and print operations according to user's operations in a second embodiment of the calculation data print process.

FIG. 8 is a view illustrating display and print operations according to user's operations in a second embodiment of the calculation data print process.

With respect to the second embodiment, the case of repeatedly recalculating change data items from different deposit data items with respect to input calculation data including multiplication or division in response to the "CHANGE" key 11d will be described.

First, similarly in the first embodiment, in the calculator 10 with the printer in which the print mode is in the ON state, if the "CA" key 11b is operated as shown in (A1) of FIG. 8, as shown in (B1) of FIG. 8, the normal print start mark "••0••" is printed on the recording sheet P (STEPS S1 to S7).

Then, as shown in (A2) to (A4) of FIG. 8, with respect to four article prices including three articles identical to one another, if the user inputs calculation data items "48+", "50×", and "3=" composed of numerical data items and operation data items by operating some numeric keys and some operation keys, while the line number data stored in the line number memory 22d is sequentially updated with "01", "02", and "03", as shown in (B1) of FIG. 3, the input calculation data items "48+", "50×", and "3=" are sequentially stored in the calculation data memory 22c (STEPS S8 to S11).

In the case where the operation data item "+" (addition) is input, calculation according to the input calculation data item "48+" is performed, and a calculation result data item "48" is displayed on the display unit 12. Also, according to the input operation data item "+" (addition), the input numerical data item "48" is added to the total (calculation result) data item of the total memory 22e, and the addition result is stored (STEP S12).

In the case where the operation data item "=" (equal) is input after the operation data item "×" (multiplication), calculation (multiplication) according to the input calculation data "50×3=" is performed, and the calculation result data item "150" is displayed on the display unit 12. Also, according to the input operation data item "=" (equal), the calculation result data item "150" is added to the total (calculation result) data item (here, "48") of the total memory 22e, and the total (calculation result) data item "198" is stored. In this case, the current line number "03" is increased by 1, thereby being updated with "04", and as shown in (B1) of FIG. 3, the calculation result data item "150" of the multiplication is stored in the calculation data memory 22c (STEP S12).

At this time, the total (calculation result) data item "198" of the total memory 22e is stored as a payment data item in the payment memory 22f (STEP S13).

Subsequently, as shown in (B1) of FIG. 8, the calculation data items "48+", "50×", and "3=" composed of the numerical data items and the operation data items and subsequently stored in the calculation data memory 22c, and the calculation result data item "150" of the multiplication according to the calculation data "50×3=" are sequentially printed on the recording sheet P (STEPS S14 and S15).

After the user inputs the calculation data sequence "48+50×3=" by operations, if the user operates the "*" (totaling function (result output function)) key 11c as shown in (A5) of FIG. 8 in order to determine the total of the calculation data (in order to issue an instruction to display and print the total) (in order to perform total determination) ("Yes" in STEP S32), the current line number "04" is increased by 1, thereby being updated with "05". Subsequently, the totaling function (result output function) data item "*" corresponding to the "*" (totaling function (result output function)) key 11c, and the total (calculation result) data item "198" stored in the total memory 22e in STEP S12 are stored in the memory area of the calculation data memory 22c corresponding to the updated line number "05" (STEP S33).

Then, the total (calculation result) data item "198" of the total memory 22e is displayed on the display unit 12 (STEP S34), and is stored as a payment data item in the payment memory 22f (STEP S35).

At this time, if the print mode is in the ON state ("Yes" in STEP S36), as shown in (B2) of FIG. 8, the total (calculation result) data item "198" and the totaling function (result output function) data item "*" stored in the total memory 22e are printed on the recording sheet P (STEP S37).

After the total data item (the payment data item) "198" of the calculation data sequence "48+50×3=" is determined, if the user inputs a numerical data item "500" representing a deposit received from the customer (STEPS S8 and S9 (the line number is updated with "06")) and operates the "CHANGE" (change function) key 11d as shown in (A6) and (A7) of FIG. 8 in order to calculate change with respect to the deposit ("Yes" in STEP S16), it is determined that a calculation data item stored (saved) in the calculation data memory 22c (see (B1) of FIG. 3) in association with the previous line number "05" of the current line number "06" is the totaling function data item "*" ("Yes" in STEP S17).

Meanwhile, if it is determined that the calculation data item immediately before the current line number "06" is not the change function data item "CHANGE" (in other words, it is determined that the current operation of inputting the "CHANGE" (change function) key 11d is the first operation of inputting the "CHANGE" (change function) key 11d ("No" in STEP S26).

Then, a calculation result data item "302" obtained by subtracting the payment data item "198" stored in the payment memory 22f from the numerical data item "500" displayed as the current deposit data item as shown in (A6) of FIG. 8 is displayed as a change data item as shown in (A7) of FIG. 8 (STEP S28).

Subsequently, as shown in (B1) of FIG. 3, the deposit data item "500" and the change function data item "CHANGE" are stored in the memory area of the calculation data memory 22c corresponding to the current line number "06", and the line number is increased by 1, thereby being updated with "07", and the change data item "302" which is the calculation result data item is stored (STEP S29).

At this time, if the print mode is in the ON state ("Yes" in STEP S30), as shown in (B3) of FIG. 8, the deposit data item "500" and the change data item "302" stored in the calculation data memory 22c are printed on the recording sheet P (STEP S31).

Also, similarly in the first embodiment, even though the user (a salesclerk) forgets to operate the "*" (totaling function) key 11c for determining the total shown in (A5) of FIG. 8, if the user inputs the numerical data item "500" representing the deposit received from the customer (STEPS S8 and S9 (the line number is updated with "05")) and operates the "CHANGE" (change function) key 11d as shown in (A6) and (A7) of FIG. 8 in order to calculate change with respect to the deposit ("Yes" in STEP S16), it is determined that a calculation data item stored (saved) in the memory area of the calculation data memory 22c (see (B1) of FIG. 3) in association with the previous line number "04" of the current line number "05" and is not the totaling function data item "*" (the totaling function (the result output function) "*" has not been stored in association with the calculation data sequence) ("No" in STEP S17).

Further, since it is determined that any one of the operation data items "+" and "=" included in the calculation data sequence "48+50×3=" stored in the calculation data memory 22c (see (B1) of FIG. 3) is an addition function data item for which the total has not been determined (an instruction to display and print the total has not been issued) ("Yes" in STEP S18), similarly in the first embodiment, the process proceeds to the automatic total addition process of FIG. 6.

In other words, the totaling function (result output function) data item "*" and the total (calculation result) data item "198" stored in the total memory 22e are stored in the memory area of the calculation data memory 22c corresponding to the current line number "05" (STEP S19), and as shown in (B2) of FIG. 8, the total (calculation result) data item "198" and the totaling function (result output function) data item "*" are printed on the recording sheet P ("Yes" in STEP S20, and STEP S21).

Further, the current line number is updated with "06", and the calculation result data item "302" obtained by subtracting the payment data item "198" stored in the payment memory 22f from the numerical data item "500" displayed as a deposit data item as shown in (A6) of FIG. 8 is displayed as a change data item as shown in (A7) of FIG. 8 (STEP S22).

Then, the deposit data item "500" and the change function data item "CHANGE" are stored in the memory area of the calculation data memory 22c corresponding to the current line number "06", and the line number is updated with "07", and the change data item "302" which is the calculation result data item is stored (STEP S23).

Subsequently, as shown in (B3) of FIG. 8, the deposit data item "500" and the change data item "302" stored in the calculation data memory 22c are printed on the recording sheet P ("Yes" in STEP S24, and STEP S25).

Thereafter, similarly in the first embodiment, for example, if the user (a salesclerk) inputs a numerical data item "508" representing a deposit received from the customer again (STEPS S8 and S9 (the line number is updated with "08")) and operates the "CHANGE" (change function) key 11d (performs an operation of inputting the "CHANGE" (change function) key 11d again) as shown in (A8) and (A9) of FIG. 8 ("YES" in STEP S16) since the customer wants to round the change data item "302", it is determined that the calculation data item immediately before the current line number "08" is not the totaling function data item "*" ("No" in STEP S17). However, since there is the totaling function data item "*" stored after the calculation data sequence "48+50×3=", it is determined that all of the operation data items "+" and "=" are addition function data items for which the total has been determined (an instruction to display and print the total has been issued) ("No" in STEP S18).

Then, it is determined that the calculating function data item immediately before the current line number "08" is the change function data item "CHANGE" corresponding to the line number "06" (in other words, it is determined that the current operation of inputting the "CHANGE" (change function) key 11d is a re-inputting operation) ("Yes" in STEP S26).

Therefore, similarly in the first embodiment, the current line number is decreased by 2, thereby being updated with "06" (STEP S27), and a calculation data item "310" obtained by subtracting the payment data item "198" from the deposit data item "508" is displayed as a update change data item as shown in (A9) of FIG. 8 (STEP S28). Also, as shown in (B2) of FIG. 3, the deposit data item "508" and the change function data item "CHANGE" are stored in the memory area of the calculation data memory 22c corresponding to the current line number "06" by rewriting, and the line number is updated with "07", and the change data item "310" which is the calculation result data item is stored by rewriting (STEP S29).

Further, as shown in (B4) of FIG. 8, the deposit data item "508" and the change data item "310" stored as update data items in the calculation data memory 22c are printed on the recording sheet P ("Yes" in STEP S30, and STEP S31).

Thereafter, even if the user (a salesclerk) inputs a numerical data item "598" representing a deposit received the customer again (STEPS S8 and S9 (the line number is updated with "08")) and operates the "CHANGE" (change function) key 11d (performs another operation of inputting the "CHANGE" (change function) key 11d again) as shown in (A10) and (A11) of FIG. 8 ("Yes" in STEP S16), in the same way as described above, the current line number is decreased by 2, thereby being updated with "06" ("No" in STEP S17, "No" in STEP S18, "Yes" in STEP S26, and STEP S27), and a calculation result data item "400" obtained by subtracting the payment data item "198" from the deposit data item "598" is displayed as an update change data item as shown in (A11) of FIG. 8 (STEP S28). Also, as shown in (B3) of FIG. 3, the deposit data item "598" and the change function data item "CHANGE" are stored in the memory area of the calculation data memory 22c corresponding to the current line number "06" by rewriting, and the line number is updated with "07", and the change data item "400" which is the calculation result data item is stored by rewriting (STEP S29).

Subsequently, as shown in (B5) of FIG. 8, the deposit data item "598" and the change data item "400" stored as update data items in the calculation data memory 22c are printed on the recording sheet P ("Yes" in STEP S30, and STEP S31).

Thereafter, if the user operates the "REPRINT" (stored-data print) key 11e ("Yes" in STEP S38), as shown in (B6) of FIG. 8, the stored-data print start mark "••••O••••" is printed on the recording sheet P (STEP S39). Subsequently, the calculation data sequence stored in the calculation data memory 22c (see (B3) of FIG. 3) is read out, and the data items "48+", "50×", "3=", "150", "198*", "598", and "400 C=" are reprinted on the recording sheet P (STEP S40).

Therefore, similarly in the first embodiment, after the user inputs a deposit data item with respect to a payment data item which corresponds to a calculation data sequence and for which the total has been determined, and makes the calculator display a change data item, the user can input a different deposit data item again in order to recalculate a change data item. Even in this case, by simple operations, it is possible to repeatedly re-input deposit data items and make the calculator recalculate and display change data items.

Also, even through the user forgets to perform determination of the total of the input calculation data sequence (the user forgets to issue an instruction to display and print the total), if the user inputs a deposit data item and operates the "CHANGE" key 11d, the calculator automatically adds the totaling function data item "*", and determines the total (calculation result) data item stored in the total memory 22e, and calculates and displays a change data item obtained by subtracting the payment data item which is the total data item from the deposit data item.

Therefore, according to the calculator 10 with the printer having the above-described configuration, if calculation of a calculation data sequence input according to user's operations and composed of numerical data items and operation data items including some of the addition, subtraction, multiplication, and division functions, a total data item which is the result of the calculation is displayed on the display unit 12, and is stored in the total memory 22e, and the total data item of the total memory 22e is stored as a payment data item in the payment memory 22f. Then, if the user inputs a data item on a deposit received from a customer, and operates the "CHANGE" (change function) key 11d, a change data item which is a calculation result obtained by subtracting the payment data item from the input deposit data item is displayed on the display unit 12. Thereafter, if the user re-inputs a deposit data item different from the deposit data item input before, and operates the "CHANGE" (change function) key 11d, a change data item which a calculation result obtained by subtracting the payment data item from the re-input deposit data item is displayed on the display unit 12.

Therefore, by simple operations, it is possible to repeatedly re-input deposit data items, and make the calculator recalculate change data items with respect to the payment data item and display the change data items.

Also, according to the calculator 10 with the printer having the above-described configuration, in the case where the numerical data items and the operation data items including some of the addition, subtraction, multiplication, and division functions are input as calculation data according to the user's operations, whenever the input is determined, a corresponding data item is sequentially stored in the calculation data memory 22c, and the total data item (the payment data item) which is the calculation result, the deposit data item, and the change data item are also sequentially stored in the calculation data memory 22c. Further, the calculation data sequence composed of the numerical data items and the operation information items, the total data item (the payment data item) which is the calculation result), the deposit data item, and the change data item stored in the calculation data memory 22c is printed on the recording sheet P in response to an operation on the "REPRINT" key 11e. Thereafter, if the user re-inputs a different deposit data item and operates the "CHANGE" (change function) key 11d, the deposit data item and the change data item stored in the calculation data memory 22c are rewritten with the different deposit data item, and a change data item which is a calculation result obtained by subtracting the payment data item from the different deposit data item.

Therefore, in the case of printing the calculation data sequence stored in the calculation data memory 22c on the recording sheet P in response to an operation on the "REPRINT" key 11e, it is possible to print the payment data item based on the numerical data items and the operation data items, the deposit data item input finally, and the change data item.

Further, according to the calculator 10 with the printer having the above-described configuration, after the input calculation data sequence is sequentially stored in the calculation data memory 22c, if the user inputs a deposit data item and operates the "CHANGE" (change function) key 11d, thereby instructing the calculator to calculate change, whether the totaling function (result output function) data item "*" is included in the end of the calculation data stored in the calculation data memory 22c and the total (payment) of the stored calculation data has been performed is determined. In the case where it is determined that the totaling function data item "*" is not included in the end of the stored calculation data and the total (payment) of the stored calculation data has not been determined, the totaling function data item "*" and the total (payment) data item stored in the total memory 22e are additionally stored after the end of the calculation data.

Therefore, even in the case where the user operates the "CHANGE" key 11d without determining the total (payment) of the input calculation data sequence, it is possible to print the payment data item which is the calculation data item, the deposit data item, and the change data item.

Also, in each embodiment described above, in the case where the change function is operated ("Yes" in STEP S16 of FIG. 5), if the previous data item is not the totaling function data item "*" ("No" in STEP S17 of FIG. 5), and the total has been determined ("Yes" in STEP S18 of FIG. 5), the totaling function data item "*" is stored in the memory area of the calculation data memory corresponding to the line number (STEP S19 of FIG. 6) before the change calculating process is performed. In the case where the change function is performed ("Yes" in STEP S16 of FIG. 5), if the print mode is in the ON state and the calculation result (total) data item has not been printed, the totaling function data item "*" may be stored in the memory area of the calculation data memory corresponding to the line number (STEP S19 of FIG. 6), and the calculation result (total) data item may be printed. Even according to this method, in the case where the change function is operated, it is possible to surely print the previous calculation result (total) data item.

Also, all of the methods of the individual processes which are performed by the calculator 10 with the printer in each embodiment, that is, the calculation data print process shown by the flow charts of FIG. 4 and FIG. 5, the automatic total addition process which is performed in the calculation data print process and is shown by the flow chart of FIG. 6, and the like can be configured as programs executable in a computer, and the programs can be stored in media of external recording devices, such as memory cards (such as ROM cards and RAM cards), magnetic disks (such as floppy (registered as a trade mark) disks and hard disks), optical disks (such as CD-ROMs and DVDs), and semiconductor memories, to distributed. Also, a computer (a CPU) of an electronic calculator having a printing function can read the programs recorded on a medium of an external recording device, and can control operations according to the read programs, thereby implementing the calculation data printing function described in each embodiment, and performing the same processes according to the above-described methods.

Also, data on the programs for realizing the methods can be transmitted in a program code form on a communication network (N), and the program data can be downloaded from a computer device (a program server) connected to the communication network (N), into a storage device of an electronic calculator having a printing function, such that it is possible to realize the above-described calculation data printing function.

The present invention is not limited to the embodiments, and can be modified in various forms at the time of carrying out the invention, without departing from the gist of the present invention. In addition, the embodiments include inventions of various stages, and thus various inventions may be extracted by appropriate combinations of a plurality of disclosed constituent elements. For example, configurations obtained by eliminating some constituent elements from among all the constituent elements shown in the embodiments or combining some constituent elements in different forms may be extracted as inventions, as long as they can solve the problem described in the article "Problem that the Invention is to Solve" and achieve the effects described in the article "Advantage of the Invention".

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A print controller comprising:
a processor; and
a memory which stores commands that cause the processor to perform:
when an operation which instructs executing a specific calculation function is received, obtaining a calculation result related to the specific calculation function; and
when an operation which instructs a printing is received, if the operation which instructs executing the specific calculation function has been received a plurality of times, without printing the calculation result related to the specific calculation function, which was obtained when the operation which instructs executing the calculation function was received one or more times before the operation received at a last time of the plurality of times, causing a printing device to print the calculation result related to the specific calculation function, which was obtained when the operation which instructs executing the specific calculation function was received at the last time of the plurality of times.

2. The print controller according to claim 1, wherein the commands cause the processor to perform:
receiving an operation which instructs executing a change function as the operation which instructs executing the specific calculation function; and
obtaining a deposit data item and a change data item as the calculation result related to the specific calculation function.

3. The print controller according to claim 2, wherein the commands cause the processor to perform:
when the operation which instructs executing the change function is received, obtaining a calculation result, which is obtained by subtracting a payment data item from the deposit data item, as the change data item.

4. The print controller according to claim 3, wherein the payment data is a numerical value stored in a payment memory when the operation which instructs executing the change function is received.

5. The print controller according to claim 4, wherein the commands cause the processor to perform:
when an operation which instructs executing a calculation operation is received, storing an addition result which is obtained by adding a calculation result obtained by executing the calculation operation according to the operation which instructs executing the calculation operation to a numerical value stored in a total memory, as the payment data item in the payment memory, or
when an operation which instructs executing a totaling function is received, storing the numerical value stored in the total memory as the payment data item in the payment memory.

6. The print controller according to claim 5, wherein the commands cause the processor to perform:
when the operation which instructs executing the totaling function is received, causing the printing device to print the numerical value stored in the total memory.

7. The print controller according to claim 5, wherein the commands cause the processor to perform:
when the operation which instructs executing the calculation operation or the operation which instructs executing the totaling function is received, storing a calculation operation data item or a totaling function data item according to the received operation, as a calculation data item in a calculation data memory; and
when the operation which instructs executing the change function is received, if previous calculation data item of the calculation data item stored in the calculation data memory is not the totaling function data item, and the calculation data item stored in the calculation data memory includes an addition function data item for which the total has not been determined, causing the printing device to print a total data item and the totaling function data item stored in the total memory without receiving the operation which instructs executing the totaling function.

8. The print controller according to claim 7, wherein the commands cause the processor to perform:

after printing the total data item and the totaling function data item stored in the total memory, causing the printing device to print the deposit data item and the change data item.

9. A print control method to be performed by a print controller, the print control method comprising:
when an operation which instructs executing a specific calculation function is received, obtaining a calculation result related to the specific calculation function; and
when an operation which instructs a printing is received, if the operation which instructs executing the specific calculation function has been received a plurality of times, without printing the calculation result related to the specific calculation function, which was obtained when the operation which instructs executing the specific calculation function was received one or more times before the operation received at a last time of the plurality of times, causing a printing device to print the calculation result related to the specific calculation function, which was obtained when the operation which instructs executing the specific calculation function was received at the last time of the plurality of times.

10. A non-transitory computer readable medium storing a program that when executed by a computer of a print controller, causes the computer to perform:
when an operation which instructs executing a specific calculation function is received, obtaining a calculation result related to the specific calculation function; and
when an operation which instructs a printing is received, if the operation which instructs executing the specific calculation function has been received a plurality of times, without printing the calculation result related to the specific calculation function, which was obtained when the operation which instructs executing the specific calculation function was received one or more times before the operation received at a last time of the plurality of times, causing a printing device to print the calculation result related to the specific calculation function, which was obtained when the operation which instructs executing the specific calculation function was received at the last time of the plurality of times.

* * * * *